Sept. 12, 1950  J. MIHALYI  2,521,933
FILM COUNTER FOR CAMERAS
Filed March 7, 1947

JOSEPH MIHALYI
INVENTOR

BY Newton M. Purvis
Donald H. Stewart
ATTORNEYS

Patented Sept. 12, 1950

2,521,933

UNITED STATES PATENT OFFICE 2,521,933

FILM COUNTER FOR CAMERAS

Joseph Mihalyi, Rochester, N. Y., assignor to Eastman Kodak Company, Rochester, N. Y., a corporation of New Jersey Application March 7, 1947, Serial No. 733,158

6 Claims. (Cl. 235—122)

1

This application relates to counting devices for use with perforated film. One object of my invention is to provide a counting device of a type useful for cameras, projectors and other mechanisms in which film is moved past an exposure aperture or frame and in which it is desirable to indicate the number of film frames intermittently moved past an aperture. Another object of my invention is to provide a counting device which is simple, efficient and inexpensive. A still further object of my invention is to provide a film counting device which can be used on the inside of a camera body and which will indicate the number of film frames on the outside of the camera body, this being capable of being made light tight. Other objects will appear from the following specification, the novel features being particularly pointed out in the claims at the end thereof.

In cameras utilizing narrow film such as 16 or 18-mm. film it is proposed to provide such film without the usual backing paper, the film being wound on a spool covered by a light tight sheath or being carried in a known type of film retort, such as the usual types of 35-mm. film retorts. The apparatus may be of the type in which the film is propelled from a spool or retort into a loose coil in a take-up chamber and then returned to the original spool or retort after exposure, and in such cases the film frames must be indicated on the outside of the camera from some form of metering device which can be operated by the film. The present invention is particularly suitable for a film which includes single perforations for each exposure frame. Obviously a different number of perforations could be provided if desired, and the invention is also suitable for films of any width providing of course that the film is perforated. My invention includes a counting device consisting of a single movable part actuated by perforations in the film.

Coming now to the drawings wherein like reference characters denote like parts throughout.

My invention consists broadly in providing a counting device operated by perforations in the film to move intermittently so that by properly centering an indicating numeral in an observation window, the number of the exposure can be accurately determined.

Figure 1:
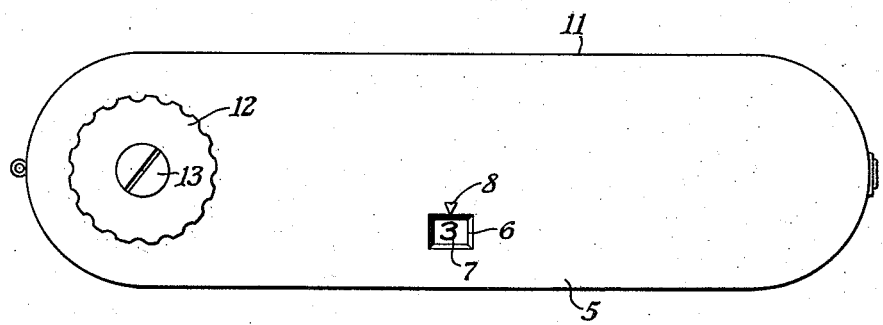
Fig. 1 is a top plan view of a camera including a counting device constructed in accordance with and embodying a preferred form of my invention.
Figure 2:
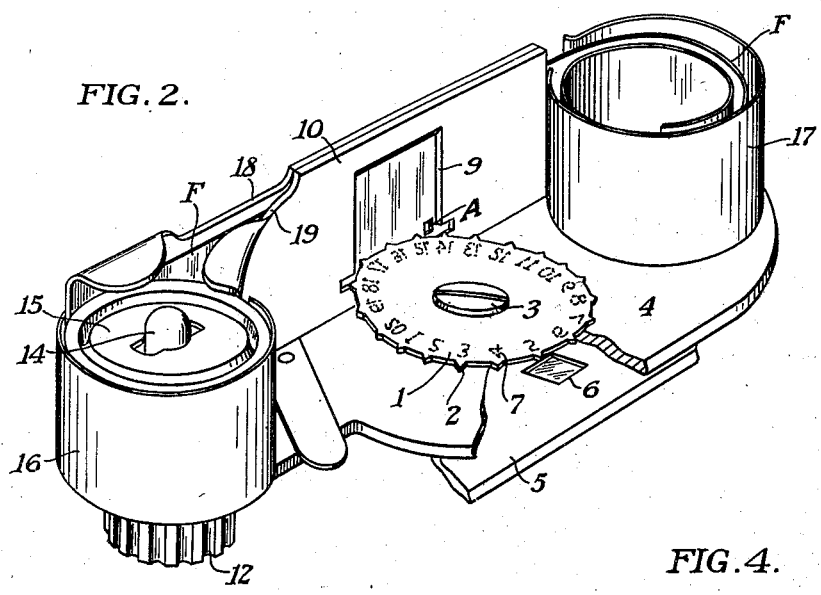
Fig. 2 is a fragmentary perspective view showing a portion of the camera and the counting device utilized in the camera of Fig. 1.

More specifically as shown in Fig. 2, my counting device may consist of a sprocket wheel 1 having teeth 2 and being carried by a stud 3 fastened to a camera mechanism plate 4. This plate, as well as an outside wall camera plate 5, is provided with a window, the window 6 in the outside plate 5 providing a view opening for an indicating numeral 7 carried directly on the sprocket wheel 1. A fiducial line or indicator 8 is provided opposite the window, and when the sprocket is in the proper position as indicated in Fig. 1, the pointer will indicate the number of the film area which lies in front of an exposure frame 9 carried by the wall 10.

In Fig. 1 my invention is shown as being applied to a roll holding camera 11 having a means for winding the film here shown as a knob 12 attached by means of a stud 13 to a shaft 14 which as indicated in Fig. 2 supports a film spool 15.

In the illustrated embodiment of my invention, the camera may include a roll holding mechanism formed by the mechanism plate 4 and the plate 10 and formed by the spool chamber 16 which constitutes a supply spool chamber and the chamber 17 which constitutes a temporary storage chamber.

The supply film chamber 16 is substantially cylindrical, and the film F may pass between converging walls 18 and 19 into a film guideway 20, which guideway is formed between the wall 10 including the exposure aperture 9 and an extension of the plate 18, forming the rear of the guideway. The film guideway 20 is an opening or slot preferably slightly less than twice the thickness W of the film F. Thus the film in passing through the guideway is confined definitely to a path of movement which terminates in the temporary storage chamber 17 in which chamber the film F may be propelled by the winding knob 12 into a loose coil.

In utilizing this mechanism it is customary to place a fresh spool of film in the supply chamber and to propel the film by means of the knob 12 into a loose coil in the temporary storage chamber 17 and to draw the film back again onto the original spool after the exposures have been made. The exposures may be made in propelling the film into the temporary chamber or they may be made in drawing the film back again onto the original spool. However, I prefer the latter system.

Figure 3:
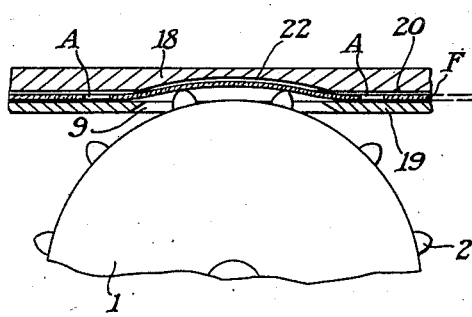
Fig. 3 is a fragmentary view partially in section showing a slipping relationship between the film and the counting sprocket.
Figure 4:
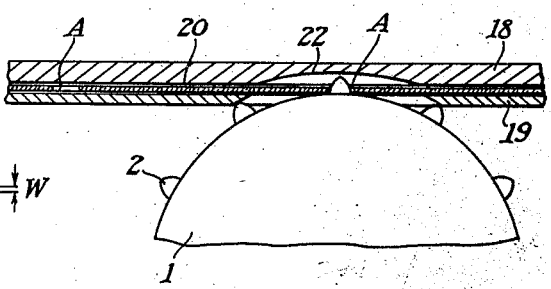
Fig. 4 is a view similar to Fig. 3 but with the sprocket held in a position to indicate the exposure frame being counted.

The film guideway 20 as indicated in Figs. 3 and 4 is provided with a rearwardly extending recess 22, this recess being arcuate in shape as shown. The depth of the recess is such that the sprocket teeth 2 of the sprocket 1 may turn freely therein, and there is also sufficient clearance for the teeth 2 to flex the film rearwardly as the film passes over the teeth without turning the sprocket. When the film is being moved from its Fig. 3 position, the sprocket will remain stationary while the film moves until an aperture A in the film reaches sprocket tooth 2. When this occurs the flexed film will snap down over sprocket tooth 2 so that the sprocket will then be moved by the film. The operator in moving the film will of course turn the knob 12 and by watching the window 6 the operator will stop the winding movement when a numeral is brought opposite the fiducial mark 8 indicating, for instance, in Fig. 1 that a third exposure frame is in place. The camera may be operated in the usual manner after which a fresh film area may be presented by again turning the knob 12. Because the sprocket teeth 2 are much closer together than the apertures A in the film F, the first movement of the film will turn the sprocket but the next adjacent to the tooth engaging the aperture A will cam the film outwardly into the arcuate recess 22 and the teeth will come to rest against the surface of the film as shown in Fig. 3. The sprocket will remain stationary at this point and will so remain until the next adjacent aperture turns the sprocket by snapping down over the next tooth.

The advantage of this arrangement is that a single dial can be made to take care of a large number of different exposures, since a single disk can be employed to move only a short distance for each area of film brought before the window 9. Moreover, the counting device is reduced to a minimum number of parts since there is only one moving part, the disk 1 and a fixed stud carrying the disk and a window through which numbers on the disk may be viewed. In the present instance I have shown 20 exposures as being registerable with the form of dial shown, but of course this can be altered by altering the spaces between the teeth 2. There must, however, be at least two teeth for every single aperture in the film if the sprocket is to be moved intermittently as above described.

It will be noticed that with the film counting mechanism shown in the illustrated embodiment of my invention that the entire counting mechanism consists of a single punched out metal part which is provided with the exposure indicating numerals. There is also the single stud on which this part turns, and the viewing window in the apparatus. The counting device is, therefore, simple, inexpensive and requires no delicate adjustments for proper operation. It is unnecessary to provide a special friction washer on the stud 3 to hold the sprocket in the Fig. 3 position while the film F is flexed over the teeth thereof because the two teeth engaging the surface of the film tend to hold the sprocket in this position from which it may freely turn when a tooth engages a sprocket aperture A.

While I have described and illustrated my invention as applied to a camera for which it is primarily intended, such a counting device may well have other uses and may be useful, for instance, in projection apparatus in which rolls of black and white or color film may be projected.

I claim:

1. A counting device for use with perforated film having perforations spaced apart a predetermined distance and adapted for use with a mechanism including a means for transporting film, said counting device comprising a support having a viewing station, a sprocket rotatably mounted on the support and carrying numerals movable past the viewing station, a film guideway for directing film past the sprocket, said sprocket including teeth spaced closer together than the film perforations and positioned to extend into the film path, said means for transporting film through the path causing said film to intermittently move the sprocket, and a fiducial mark for indicating on the sprocket scale the number of film areas wound when a sprocket tooth lies in a film perforation.

2. The counting device defined in claim 1 characterized by the film guideway including a wider opening opposite the sprocket than throughout the main film guiding portion thereof whereby the film may flex and ride over the sprocket teeth.

3. The counting device defined in claim 1 characterized by the film guideway comprising a passageway of not greater width than twice the thickness of the film, said passageway including a recess adjacent the sprocket through which the sprocket teeth may freely turn and into which the film may flex.

4. The counting device defined in claim 1 characterized by the film guideway comprising a passageway of not greater width than twice the thickness of the film, said passageway including a recess adjacent the sprocket through which the sprocket teeth may freely turn and ino which the film may flex, said recess clearing the sprocket teeth by a distance greater than the thickness of the film.

5. Counting device for use with perforated film having perforations spaced apart a predetermined distance and adapted for use in a winding mechanism including a means for transporting film, said counting device comprising a support having a viewing station, a sprocket rotatably mounted on the support and carrying numerals movable past the viewing station, a film guideway for directing film past the sprocket, said sprocket including teeth spaced closer together than the film perforations and positioned to extend into the film path, with the film tangent to the periphery of the sprocket when a tooth of the sprocket passes through a film aperture, said means for transporting the film moving the sprocket through movement of the film, said film guideway including a recess into which the film may be flexed by a sprocket tooth when a sprocket tooth engages the surface of the film.

6. Counting device for use with perforated film having perforations spaced apart a predetermined distance and adapted for use with a winding mechanism including means for transporting film, said counting device comprising a support having a viewing station, a sprocket rotatably mounted on the support and carrying numerals movable past the viewing station, a film guideway for directing film past the sprocket, said sprocket including teeth spaced closer together than the film perforations and positioned to extend into the film path, said means for transporting film moving the film through the path and intermittently thereby moving the sprocket, the film guideway including a recess adjacent the sprocket whereby the film may move and flex in alternately sliding over and engaging the teeth of the sprocket to turn the sprocket intermittently and in equal increments for each film aperture.

JOSEPH MIHALYI.

REFERENCES CITED

The following references are of record in the file of this patent:

UNITED STATES PATENTS

| Number | Name | Date |
|---|---|---|
| 645,370 | McCurdy | Mar. 13, 1900 |
| 687,330 | McCurdy | Nov. 26, 1901 |
| 1,841,711 | Cannon | Jan. 19, 1932 |
| 2,358,327 | Harris | Sept. 19, 1944 |